United States Patent Office 3,763,167
Patented Oct. 2, 1973

3,763,167
PROCESS OF PURIFYING ORIPAVINES
William R. Hydro, Bel Air, Md., assignor to the United States of America as represented by the Secretary of the Army
No Drawing. Filed June 24, 1970, Ser. No. 48,782
Int. Cl. A61k 27/00; C07d 33/00
U.S. Cl. 260—285    6 Claims

ABSTRACT OF THE DISCLOSURE

The process of purifying oripavines, tranquilizers for animals, comprising the contacting highly colored oripavines with a liquid comprising an immiscible solvent and aqueous solution of sulfur containing compounds, separating the solvent phase with subsequent drying and recovering the oripavines.

DEDICATORY CLAUSE

The invention described herein may be manufactured, used, and licensed by or for the Government for governmental purposes without the payment to me of any royalty thereon.

SPECIFICATION

This invention relates to a novel process for preparing oripavines in higher yields.

The object of this invention is to utilize sulfur containing compounds as the purification vehicle in preparing oripavines.

It is a further object of this invention to employ a less cumbersome purification process.

This invention relates to a novel purification process for 7-$\alpha$(1 - hydroxy - 1, 4 - dimethylpentyl) - 6,14 - endo-ethenotetrahydrooripavine and 7 - $\alpha$(1 - hydroxy-1-methylbutyl)-6,14-endo-ethenotetrahydrooripavine.

These compounds have been reported in a series of papers by K. W. Bentley et al., J. Am. Chem. Soc., vol 89, (1967), pages 3267 et seq. K. W. Bentley et al. purified the oripavines utilizing refluxing conditions of aqueous 2-ethoxyethanol and activated charcoal treatment followed by the recrystallization in hot aqueous 2-ethoxyethanol.

The oripavines of Bentley et al., supra, have been employed as tranquilizers in gas-propelled dart guns to subdue wild animals thus enabling their capture without harm and transport to a game reserve or for examination and care by a veterinary. In addition, the oripavines can be administered subcutaneously by a veterinary.

Pharmacological evaluation of 7-$\alpha$(1 - hydroxy - 1,4-dimethylpentyl) - 6,14 - endo - ethenotetrahydrooripavine and 7 - $\alpha$(1 - hydroxy - 1 - methylbutyl) - 6,14 - endo-ethenotetrahydrooripavine for potency was determined by administering intravenously various proportions (mg./kg.) of the compounds in mice using the method described in "The Search For and Selection of Toxic Chemical Agents for Weapons Systems," disclosed in the Edgewood Arsenal, Maryland Publication (CRDL SOP 70-3, May 6, 1965). $LD_{50}$ is the lowest dose in milligrams of compound per kilogram of animal required to be lethal in 50% of the tested animals. $MED_{50}$ is the minimum effective dose in milligrams of compound per kilogram of animal required to give any visible physiological effects (e.g. decreased locomotive activity, aimless wandering and glossy-eyed stare in 50% of the tested animals). The quotient of the ration $LD_{50}/MED_{50}$ described in Table 1 below in the margin of safety, that is, the higher numerical quotient, the greater the proportion of agent can be used before causing death and therefore a more effective tranquilizing agent.

TABLE I

| Compound: | $ED_{50}$ | $MED_{50}$ | $LD_{50}/MED_{50}$ |
|---|---|---|---|
| A | 8.9 | 0.00075 | 12,000 |
| B | 20.0 | 0.00056 | 36,000 |

NOTE.—A=7-$\alpha$-(1-hydroxy-1,4-dimethylpentyl)-6,14-endo-ethenotetrahydrooripavine; B=7-$\alpha$-(1-hydroxy-1-methylbutyl)-6,14-endoethenotetrahydrooripavine.

THE GENERAL PROCEDURE

Thebaine was reacted with methyl vinyl ketone forming 7-$\alpha$-acetyl - 6,14 - endo - ethenotetrahydrothebaine, thevinone. Then the Grignard reaction of said thevinone with n-propylmagnesium iodide or isoamylmagnesium bromide (other alkylmagnesium halides can also be utilized if desired) gave the corresponding thebaines (a) 7 - $\alpha$ - (1 - hydroxy - 1 - methylbutyl) - 6,14 - endo-ethenotetrahydrothebaine and (b) 7 - $\alpha$ - (1 - hydroxy-1,4 - dimethylpentyl)-6,14-endo-ethenotetrahydrothebaine. The aforesaid compounds (a) and (b) were O-demethylated in the 3-position to the corresponding crude (c) 7 - $\alpha$ - (1 - hydroxy - 1 - methylbutyl) - 6,14 - endo-ethenotetrahydrooripavine and (d) 7-$\alpha$-(1-hydroxy - 1,4-dimethylpentyl) - 6,14 - endo-ethenotetrahydrooripavine. The product (c) and (d) were extracted with ether. The ethereal extract was shaken at room temperature with an aqueous solution containing 0.5 to 4.0 g. of a sulfur containing compound. The ether extract containing the decolorized product was evaporated giving rise to a solid which is dissolved in 2-ethoxyethanol at 60° C. or below, then adding water to effect precipitation of the final oripavines.

The purification step at room temperature is carried out in a solution comprising 80–120 ml. of water and 0.5 to 4.0 g. of a sulfur containing compound of an alkali metal, i.e. Na or K, salt of metabisulfite, bisulfite, sulfite, hydrosulfite or thiosulfate followed by recrystallization in 2-ethoxyethanol at a temperature of 60° C. or below. In this invention, it is critical for the purification procedure that ambient conditions are maintained during the step employing the aqueous solution comprising the sulfur containing compound and that the temperature of the 2-ethoxyethanol not rise above 60° C. in the recrystallization step in order to achieve the high yields.

EXAMPLE 1

(a) A solution comprising thebaine, paramorphine, (141.7 g.) and 425 ml. methyl vinyl ketone was refluxed for about 1 hour. Excess ketone was removed by distillating for about 1 hour from a hot water bath followed by distillation at 150 mm. pressure. The hot reacted mixture, a dark brown-colored syrup, was dissolved in hot methyl alcohol followed by rapid cooling giving rise to fine brown crystals. Recrystallization from methyl alcohol afforded fine whte crystals, M.P. 114.5–118°. Infrared analysis confirmed the proposed structure of 7-$\alpha$-acetyl-6,14-endo-ethenotetrahydrothebaine.

*Analysis.*—Calcd. for $C_{23}H_{27}NO_4$ (percent): C, 72.42; H, 7.13; N, 3.67; O, 16.78. Found (percent): C, 72.1; H, 7.3; N, 3.6; O, 16.8.

(b) Magnesium (8.35 g.) was treated to remove grease by washing with ether and drying overnight in vacuo at 85° C. The magnesium was covered with sodium-dried ether, heated to reflux with vigorous stirring, followed by the addition of a solution of 58.5 g. of freshly distilled n-propyl iodide in 400 ml. of sodium-dried ether over 1 hour period and refluxed an additional 40 minutes.

A filtered solution comprising 50.0 g. of 7-α-acetyl-6,14-endoethenotetrahydrothebaine, from (a) supra, in 250 ml. of sodium-dried benzene was added over a period of 20 minutes forming a reaction mixture which was refluxed for an additional 30 minutes. The reaction vessel was cooled to 0° C. and the reacted mixture, black, was decomposed with a solution comprising 22.4 g. of ammonium chloride in 75 ml. of water. The organic layer, upper, was removed leaving a paste-like residue which was washed three (3) times with 50 ml. portions of benzene and the combined said portions were washed three (3) times with water, dried over anhydrous magnesium sulfate, filtered and evaporation of the pale yellow portions in vacuo afforded 54.6 g. of white solid which was recrystallized from ethyl alcohol yielding 25.3 g. of white crystals, M.P. 173°–176° C. The infrared analysis confirmed the proposed structure of 7-α-(1-hydroxy-1-methylbutyl) - 6,14 - endo-ethenotetrahydrothebaine.

Analysis.—Calcd. for $C_{26}H_{35}NO_4$ (percent): C, 73.38; H, 8.29; N, 3.29; O, 15.04. Found (percent): C, 73.5; H, 8.0; N, 3.3; O, 15.2.

(c) In accordance with the procedure as outlined in (b) supra, with the exception of substituting 52.0 g. of freshly distilled isoamyl bromide for the n-propyl iodide 43.8 g. crude end-product was obtained which was recrystallized 4 times from ethyl alcohol giving rise to fine white crystals, M.P. 126°–127° C. The infrared analysis confirmed the proposed structure of 7-α-(1-hydroxy-1,4-dimethylpentyl)-6,14-endo-ethenotetrahydrothebaine.

Analysis.—Calcd. for $C_{28}H_{39}NO_4$ (precnt): C, 74.14; H, 8.67; N, 3.09; O, 14.11. Found (percent): C, 74.2; H, 8.2; N, 3.2; O, 14.1.

EXAMPLE 2

(a) A stirring solution comprising bubbling a stream of nitrogen through 300 ml. of diethylene glycol in a container was heated to and discontinued at 55° C., adding 120 g. of potassium hydroxide forming a mixture which was heated to 200° C., adding 16.0 g. of 7-α-(1-hydroxy-1,4-dimethylpentyl)-6,14 - endo - ethenotetrahydrothebaine, Example 1(c), then fitting the container with a condenser and heating to 203°–205° C. for about 1.25 hours resulting in O-demethylation in the 3-position which was considered complete when a one ml. sample of the reacted mixture, dark reddish-brown colored solution, is diluted with 10 ml. of water producing a clear, homogeneous solution. The reacted mixture was cooled to 100° C., diluted with water to five times its volume and filtering through diatomaceous earth, Celite, producing a clarified dark reddish-brown solution, adding a precipitating solution comprising 125.0 g. of ammonium chloride in 375 ml. water forming the insoluble desired product which was extracted once in 500 ml. diethylether, and if desired the ether extract can be further treated with water, the diethylether extract, dark reddish-brown solution, was shaken with a solution comprising 0.5 to 4.0 g. sodium metabisulfite in 100 ml. of water for about 3–6 minutes with the ethereal phase converting to a very pale yellow color. The ethereal phase was washed with water, separated, dried over anhydrous magnesium sulfate, filtered, and evaporated in vacuo to give 12.4 g. (80.0%) of a pale yellow solid, M.P. 200°–202° C. Three recrystallizations were carried out with the yellow solid the steps comprising the adding 90–110 ml. of the 2-ethoxyethanol warmed to 60° C. or lower sufficient to dissolve the yellow solid, then adding about 35 to 40 ml. of water to the ethanol solution for the formation of pale yellow crystals 9.5 g. (61.3%), M.P. 200–204° C. The infrared analysis confirmed the proposed structure of 7-α-(1-hydroxy-1,4-dimethylpentyl)-6,14-endo-ethenotetrahydrooripavine.

Analysis.—Calcd. for $C_{27}H_{37}NO_4$ (percent): C, 73.77; H, 8.49; N, 3.19; O, 14.56. Found (percent): C, 73.9; H, 8.4; N, 3.1; O, 14.5.

(b) The procedure in (a) was repeated with the substitution of sodium bisulfite, sodium hydrosulfite, sodium sulfite or sodium thiosulfate for the corresponding metabisulfite with the decolorization of the ethereal solution and solid as described in Table 1.

TABLE 1.—COLOR OF ETHER EXTRACT CONTAINING COMPOUND AFTER TREATMENT

| Sulfur compound | Ethereal solution | Solid |
| --- | --- | --- |
| Sodium metabisulfite | Very pale yellow | Pale yellow. |
| Sodium bisulfite | Very pale yellow | Pale yellow. |
| Sodium hydrosulfite | Colorless | Snow white. |
| Sodium sulfite | Colorless | Snow white. |
| Sodium thiosulfate | Dark yellow | Light yellow. |

EXAMPLE 3

(a) The procedure in Example 2 was followed with substituting 7-α-(1-hydroxy-1-methylbutyl)-6,14 - endo-ethenotetrahydrothebaine, Example 1(b), for the corresponding 7-α-(1-hydroxy - 1,4 - dimethylpentyl)-6,14-endoethenotetrahydrothebaine. After the precipitation step with the aqueous ammonium chloride solution and the separated diethylether extract, the etheral extract, reddish-brown color, was shaken for 3–6 minutes with a solution comprising 3.2 g. of sodium metabisulfite in 100 ml. of water with the ethereal phase converting to a pale yellow color. The latter ethereal phase was also treated as in Example 2. The recrystallization from aqueous 2-ethoxyethanol yield 3.8 g. (24.6%) of white crystals, M.P. 214°–217° C. The infrared analysis confirmed the proposed structure of 7-α-(1-hydroxyl-1-methylbutyl)-6,14-endo-ethenotetrahydrooripavine.

Analysis.—Calcd. for $C_{25}H_{33}NO_4$ (percent): C, 72.96; H, 8.08; O, 15.15. Found (percent): C, 72.8; H, 8.0; O, 15.6.

(b) The procedure in (a) was repeated with the substitution of sodium bisulfite, sodium hydrosulfite, sodium sulfite or sodium thiosulfate for the corresponding metabisulfite with the decolorization of the ethereal solution.

Example 4, below, illustrates the purification procedure described in the series of paper by K. W. Bentley et al., J. Am. Chem. Soc., vol. 89 (1967), page 3267 et al.

EXAMPLE 4

Employing the general procedure, that is, proportions, reactants and conditions as set forth in above Example 2, up to and including the diethylether extract, dark reddish-brown extract from the insoluble product precipitated by the aqueous ammonium chloride step, was washed with water dried over anhydrous magnesium sulfate and evaporation of the ether leaving a very dark brown solid. Refluxing, about 30 minutes, a solution comprising the latter dark brown solid, 2-ethoxyethanol and activated charcoal, filtering, washing the charcoal cake with boiling temperature (135° C.) 2-ethoxyethanol, combining and washings, and then adding water to the boiling 2-ethoxyethanol washings to effect crystallization and yielding 9.4 g. (60%) of a dark brown solid and recrystallization of the latter brown solid from refluxing activated charcoal and 2-ethoxyethanol and precipitation upon the water addition yielding 4.2 g. (27.1%, a medium brown colored solid, M.P. about 198–202° C., 7-α-(1-hydroxy - 1,4 - dimethylpentyl)-6,14-endo-etheno-tetrahydrooripavine.

I claim:

1. A process of purifying a hydroxyalkyl-6,14-endoethenotetrahydrooripavine comprising the steps of contacting an immiscible solvent containing said oripavine with an aqueous solution of a sulfur compound being an alkali metal salt selected from the group consisting of metabisulfite, bisulfite, sulfite, hydrosulfite and thiosulfate, thereby forming a solvent colored solution, separating the solvent solution and adding water to said solvent solution, removing and drying the solvent solution and recovering the purified oripavine(s).

2. The method according to claim 1, wherein the aqueous sulfur compound solution comprises 80 to 120 ml. water and 0.5 to 4.0 g. of said sulfur compound.

3. The method according to claim 1 including the steps of contacting the purified oripavine(s) with 2-ethoxyethanol at a temperature below 60° C. forming a solution and, adding water to said ethanol solution to form oripavine crystals.

4. The method according to claim 3, wherein the 2-ethoxyethanol is added in the range of 90 to 110 ml., per 12.4 g. of oripavine and about 35 to 45 ml. of water is added to the ethanol solution to form oripavine crystals.

5. The process according to claim 1, wherein the oripavine is 7-α-(1-hydroxy-1-methyl butyl) - 6,14 - endo-ethenotetrahydrooripavine or 7-α-(1-hydroxy-1,4-dimethylpentyl)-6,14-endo-ethenotetrahydrooripavine.

6. The process according to claim 1 carried out at room temperature.

References Cited

UNITED STATES PATENTS

| | | | |
|---|---|---|---|
| 3,433,791 | 3/1969 | Bentley | 260—285 |
| 3,442,900 | 5/1969 | Bentley | 260—285 |
| 3,464,992 | 9/1969 | Mayor et al. | 260—285 |
| 3,464,994 | 9/1969 | Bentley et al. | 260—285 |
| 3,474,101 | 10/1969 | Bentley | 260—285 |
| 3,562,279 | 2/1971 | Brown et al. | 260—285 |

FOREIGN PATENTS

| | | | |
|---|---|---|---|
| 487,263 | 10/1952 | Canada | 260—285 |

LELAND A. SEBASTIAN, Examiner

U.S. Cl. X.R.

260—999; 424—260